United States Patent [19]
Valvo et al.

[11] Patent Number: 4,913,083
[45] Date of Patent: Apr. 3, 1990

[54] METHOD FOR REMINDING A PERSON WHEN TO TAKE MEDICATION

[76] Inventors: James Valvo; Paul Valvo, both of 40 Washington St., Babylon, N.Y. 11702

[21] Appl. No.: 261,343

[22] Filed: Oct. 24, 1988

[51] Int. Cl.[4] .................... G01D 13/04; G09F 9/40; B65D 85/56

[52] U.S. Cl. .................... 116/308; 116/311; 116/315; 116/201; 40/310; 40/311; 206/534

[58] Field of Search .............. 116/308, 311, 315, 317, 116/201, 309; 40/310, 311, 638; 206/534, 459, 807; 215/230, 203, 222, 206, 220

[56] References Cited

U.S. PATENT DOCUMENTS

| | | | |
|---|---|---|---|
| 2,706,464 | 4/1955 | North | 116/308 |
| 2,914,166 | 11/1959 | Bihler | 40/299 |
| 3,706,626 | 12/1972 | Smith et al. | 40/299 |
| 3,818,858 | 6/1974 | Kramer et al. | 116/308 |
| 3,896,959 | 7/1975 | Roy | 215/222 |
| 4,238,033 | 12/1980 | Artzt | 206/534 |
| 4,288,006 | 9/1981 | Clover, Jr. | 222/42 |
| 4,749,093 | 6/1988 | Trick | 215/220 |
| 4,753,189 | 6/1988 | Mastman et al. | 116/308 |

*Primary Examiner*—William A. Cuchlinski, Jr.
*Assistant Examiner*—W. Morris Worth
*Attorney, Agent, or Firm*—Michael I. Kroll

[57] ABSTRACT

A method for reminding a person when to take medication, is provided. A series of indicia are put on a plurality of flat areas about the circumference of the safety cap, which are in line with the interior stops of the safety cap. The indicia corresponds to times medication is required to be taken. The safety cap is placed upon a safety bottle in such a manner that one of the flat areas line up with an indicator below one of the plurality of exterior stops on the safety bottle that engage with the interior stops of the safety cap so as to show a person the first time medication is to be taken. The safety cap is then removed from the safety bottle and then replaced back on the safety bottle in such a manner that each next in sequence of the flat areas line up with the indicator 22 so as to show the person each next time medication is to be taken.

6 Claims, 1 Drawing Sheet

METHOD FOR REMINDING A PERSON WHEN TO TAKE MEDICATION

BACKGROUND OF THE INVENTION

1. Field of the Invention

The instant invention relates generally to timers and more specifically it relates to a method for reminding a person when to take medication.

2. Description of the Prior Art

Numerous timers, which are switches or regulators have been provided in prior art that are adapted to control or activate other mechanisms at fixed intervals. While these units may be suitable for the particular purpose to which they address, they would not be as suitable for the purposes of the present invention as heretofore described.

SUMMARY OF THE INVENTION

A primary object of the present invention is to provide a method for reminding a person when to take medication that will overcome the shortcomings of the prior art devices.

Another object is to provide a method for reminding a person when to take medication in which by looking at the safety cap the person will be reminded to take the medication.

An additional object is to provide a method for reminding a person when to take medication whereby if for any reason they can't remember whether or not they took their medication, they can immediately tell by noting if the safety cap has or has not been moved to the next time of indication on the safety bottle.

A further object is to provide a method for reminding a person when to take medication that is simple and easy to use.

A still further object is to provide a method for reminding a person when to take medication that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

DETAILED DESCRIPTION OF THE PREFERRED EMBODIMENTS

Figure 1:
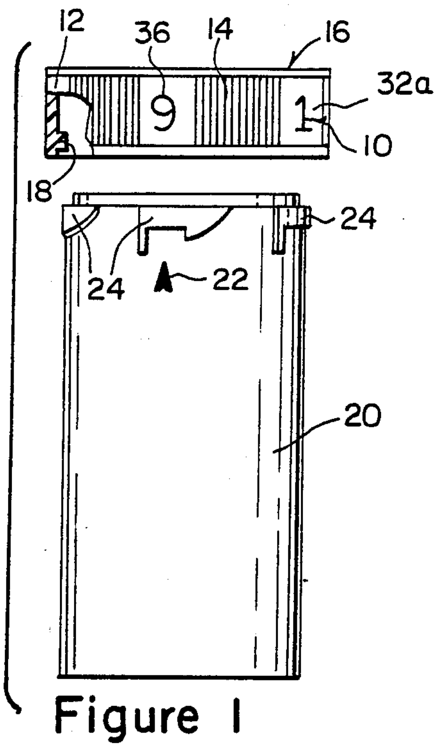
FIG. 1 is an elevational view showing the safety bottle with safety cap removed and broken away.
Figure 2:
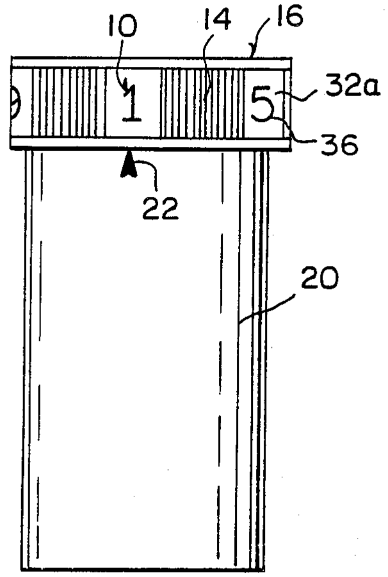
FIG. 2 is an elevational view showing the safety bottle with safety cap replaced thereon in a different position to indicate time to take medication.

Turning now descriptively to the drawings, in which similar reference characters denote similar elements throughout the several views. The figures are illustrative of a method for reminding a person when to take medication. A series of indicia 10 are put upon a plurality of flat areas 12 about circumference 14 of a safety cap 16. The indicia 10 are in line with interior stops 18 on the safety cap 16. The indicia 10 corresponds to times medication is required to be taken. The safety cap 16 is placed upon a safety bottle 20, in such a manner, that one of the flat areas 12 will line up with an indicator 22 which is below one of a plurality of exterior stops 24 on the safety bottle 20. The exterior stops 24 engage with the interior stops 18 on the safety cap 16 so as to show a person when first time medication is to be taken. The safety cap 16 is then removed from the safety bottle 20 and then replaced upon the safety bottle 20 in such a manner that each next in sequence of the flat areas 12 will line up with the indicator 22 so as to show the person, when next time medication is to be taken.

Figure 4:
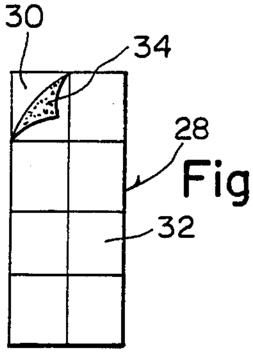
FIG. 4 is a top view of a strip of blank stickers.
Figure 5:
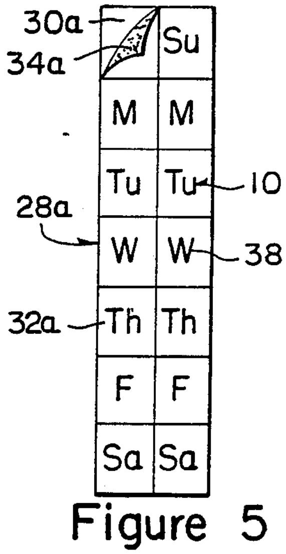
FIG. 5 is a top view of a strip of day of the week stickers.
Figure 6:
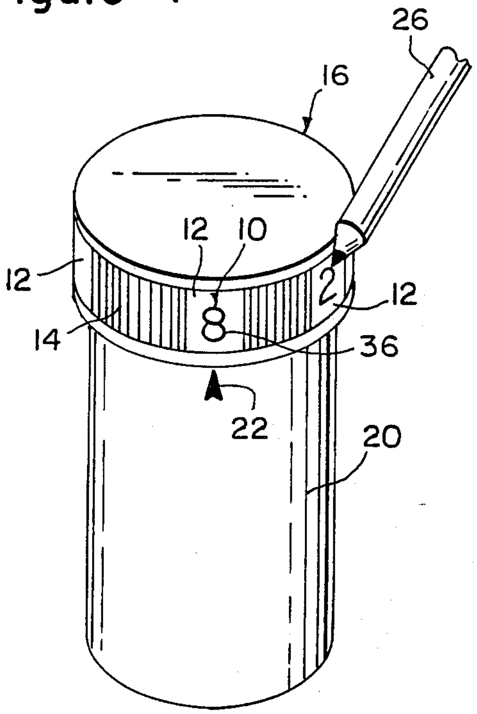
FIG. 6 is a perspective view of the safety bottle with safety cap thereon and a pen for writing the numbers on the flat areas of the cap.

The indicia 10 can be written directly upon the flat areas 12 of the safety cap 16 with a pen 26 containing water soluble ink (see FIG. 6). The indicia 10 can be written upon a strip of blank stickers 28 with the pen 26. The strip of blank stickers 28 includes a paper backing 30 disposed on each of the blank stickers 32. Each of the blank stickers 32 have adhesive 34 on reverse side thereof (see FIG. 4). The indicia 10 can be printed upon a strip of stickers **28*a*. The strip of stickers also includes a paper backing 30*a* and each of the printed stickers 32*a* has adhesive 34*a* on reverse side thereof (see FIGS. 3 and 5**).

Figure 3:
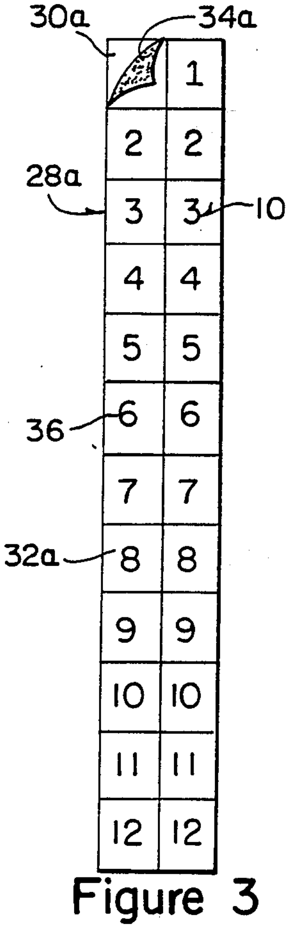
FIG. 3 is a top view of a strip of number stickers.

As shown in FIG. 3, the indicia 10 are numbers 36 being "1" through "12" while in FIG. 5 the indicia 10 is abreviated days of the week 38 being "Sunday " through "Saturday". The indicia 10 can be other information besides the type illustrated in the drawing.

It will be understood that each of the elements described above, or two or more together, may also find a useful application in other types of methods differing from the type described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. A method for reminding a person when to take medication, comprising the steps of:
   (a) putting a series of indicia upon a plurality of flat areas about circumference of a safety cap , said series of indicia being in line with interior stops on said safety cap, said indicia corresponding to times medication is required to be taken;
   (b) placing said safety cap upon a single compartment safety bottle in such a manner that one of said flat areas line up with an indicator below one of a plurality of exterior stops on said single compartment safety bottle, and using indicia fixed to said safety cap to identify time of use, said safety cap being removed and reset to change the indicia since said exterior stop has a ramp terminating at a recess in which a hook of said interior stop locks into, said exterior stops engaging with said interior stops on said safety cap so as to show a person first time medication is to be taken and prevent unwanted rotational and longitudinal movement of said safety cap relative to said single compartment safety bottle so that the setting of said indicia is not accidentally changed;

(c) removing said safety cap from said single compartment safety bottle; and (d) replacing said safety cap upon said single compartment safety bottle in such a manner that each next in sequence of said flat areas line up with said indicator so as to show the person each next time medication is to be taken.

2. A reminding method as recited in claim 1, wherein said indicia are written directly upon said flat areas of said safety cap with a pen.

3. A reminding method as recited in claim 1, wherein said indicia are written upon a strip of blank opaque stickers with a pen, said strip of blank opaque stickers including a paper backing, each of said blank opaque stickers having adhesive on reverse side thereof.

4. A reminding method as recited in claim 1, wherein said indicia are printed upon a strip of blank opaque stickers, said strip of opaque stickers including a paper backing, each of said printing opaque stickers having adhesives on reverse side thereof.

5. A reminding method as recited in claim 1, wherein said indicia are numbers "1" through "12" so that each indicia can serve as an hour of the day.

6. A reminding method as recited in claim 1, wherein said indicia are abreviated days of a week "Sunday" through "Saturday".

* * * * *